US006996322B2

(12) United States Patent
Bennett et al.

(10) Patent No.: US 6,996,322 B2
(45) Date of Patent: Feb. 7, 2006

(54) DISPERSION COMPENSATION MODULE

(75) Inventors: Kevin W. Bennett, Hammondsport, NY (US); Paul O. Johnson, Corning, NY (US); Paul C. Trifoso, Corning, NY (US); Todd M. Wetherill, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 173 days.

(21) Appl. No.: 10/719,390

(22) Filed: Nov. 20, 2003

(65) Prior Publication Data

US 2004/0146265 A1 Jul. 29, 2004

Related U.S. Application Data

(60) Provisional application No. 60/443,075, filed on Jan. 28, 2003.

(51) Int. Cl.
*G02B 6/00* (2006.01)

(52) U.S. Cl. ....................................... 385/135; 385/137

(58) Field of Classification Search ......... 385/134–137
See application file for complete search history.

(56) References Cited

U.S. PATENT DOCUMENTS 5,778,132 A 7/1998 Csipkes et al. ............. 385/135
6,055,081 A 4/2000 Koyano et al. ............. 359/161
6,456,773 B1 9/2002 Keys .......................... 385/135
6,533,205 B1 * 3/2003 Kles ........................... 385/134
6,546,180 B1 * 4/2003 Koyano et al. ............. 385/135
2002/0117571 A1 * 8/2002 Scott et al. ................. 242/388
2003/0059192 A1 * 3/2003 Johnson ...................... 385/135

OTHER PUBLICATIONS

"High-performanve Dispersion-slope and Dispersion Compensation Modules", Aikawa, et al Fujikura Technical Review, 2002, pps 59-64.

* cited by examiner

*Primary Examiner*—Rodney Bovernick
*Assistant Examiner*—Omar Rojas
(74) *Attorney, Agent, or Firm*—Walter M. Douglas

(57) ABSTRACT

The invention is directed to a dispersion compensation module of extremely simple design that does not rely on a spool-and-hub or similar device for holding the optical fiber used in the module, such module being here termed a "Free-Fiber dispersion compensation module". In the inventive dispersion compensation module the optical fiber therein is in a relaxed coiled configuration having minimal tension. It has also been discovered that while coil tension is relieved by removing it from the winding spool prior to placing it in the dispersion compensation module, the tension can be further relieved by coating the coiled fiber with a finely powdered substance which will not react with or otherwise harm or damage wither the fiber or the module containing it, for example, talcum powder.

6 Claims, 8 Drawing Sheets

DISPERSION COMPENSATION MODULE

PRIORITY

This application claims the benefit of U.S. Provisional Patent Application No. 60/443,075, filed Jan. 28, 2003, titled “DISPERSION COMPENSATION MODULE”.

FIELD OF THE INVENTION

The invention is directed to optical communications systems and in particular to dispersion compensation modules that are used in such systems.

BACKGROUND OF THE INVENTION

The distance over which data can be transmitted in optical fibers is limited by optical power loss and spectral pulse dispersion. With the advent of erbium-doped optical fiber amplifiers this limitation has been virtually eliminated, particularly for optical communications systems operating in the 1550 nm band. To compensate for power loss and dispersion, a compensating optical fiber, as part of an amplification and/or transmission system, is typically wound on a spool and the spool is used as-is or is placed in a housing. Leads are attached to the end of the optical fiber for connecting to the optical communications systems. This entire device may be described as a “dispersion compensation module.”

Presently, fiber-based dispersion compensating modules made at Corning Incorporated and other manufacturers utilize a length of dispersion compensating fiber, for example, an erbium-doped fiber that is wound on a spool. Some spools are molded and cost effective, but most spools are made by attaching steel or aluminum flanges to each side of a hub. This process of spool assembly involves the costly assembly of custom parts, the exact configuration of which depends on the customer requirements. Consequently, different spools must be designed and stored for each customer. The spool is then installed in a box enclosure or, alternatively, a protective band is placed around the outer diameter of the spool to protect the fiber and the spool is used as is. (Either configuration may be termed a dispersion compensation module.) A typical spool assembly of the prior art is illustrated in FIG. 1.

When the typical spool such as that in FIG. 1 is wound under tension with dispersion compensating fiber (DCF), a “buffer layer” of optical fiber is first laid on the hub of the spool. The exact number of layers may vary, but generally fall in the range of 5–10 layers. This buffer layer will not be connected to or utilized by the optical communications system. The purpose of the fiber buffer layer is to form a protective layer for the fiber that is actually being used in the product DCF (the “operating fiber”) from falling into the crevice that can occur between the flange and the hub of the spool. In addition, the buffer layer serves to protect the DCF from the hub during thermal excursions in which the hub will expand at a different rate than the DCF. If the operating fiber were not so protected it would rub on the hub at that location and could be damaged, resulting in a failed dispersion compensation module. Consequently, while the buffer layer is a necessary item in the typical winding operation of a spool assembly, it adds cost and complexity to the finished product.

Once the spool is wound, the optical fiber on the spool remains at some level of tension. This tension is believed to degrade the optical properties of the fiber over time. In addition, during thermal excursions, whether in manufacturing, testing, or field use, the fiber can be further stressed due to thermal expansion effects as the hub expands more than the fiber pack. This can cause further optical problems, and in a worst case, reliability issues such as fiber breakage can occur.

As a result of the foregoing problems, there exists a need for a dispersion compensation module which does not rely on a spool to hold the fiber and does not require the use of a buffer layer of costly fiber to protect the operating DCF. There is also a need for a dispersion compensation module in which the DCF if not under tension or in which the tension has been sufficient relaxed so that stress-induce problem doe not arise in the fiber with the passage of time.

SUMMARY OF THE INVENTION

The invention is directed to a dispersion compensation module of extremely simple design that does not rely on a spool-and-hub or similar device for holding the optical fiber used in the module, such module being here termed a “Free-Fiber dispersion compensation module”.

The invention is further directed to a dispersion compensation module in which the optical fiber therein is in a relaxed coiled configuration.

The invention is also directed to a method of making a Free-Fiber dispersion compensation module and a device that can be used in such method.

In particular the invention is directed to a dispersion compensation module for optical communication that is a take-apart cassette having, among other elements, a first part and a second part. The first part includes a first and a second shaped structure therein, the first shaped structure being located within the second shaped structure. The second part is a lid or other form of closure element for the first part and its contents. The take-apart cassette also includes a coil of optical fiber having a first fiber end and a second fiber end for attachment to other elements. The coil is located between said first and second shaped structures. The coil of fibers is separately wound on a winding spool or other element and removed from the winding spool prior to being placed between the two shaped structures. The first and second end of the coil is connected to a first and a second pigtail. The pigtails are located at the outer perimeter of said cassette for connecting the coil of optical fiber within the cassette to an optical communication system. The second shaped structure has at least two openings there through for passage of the first and second ends of said fiber coil to the first and second pigtails, respectively.

A further aspect of the invention is that while fiber coil tension is relieved or relaxed by removing it from the winding spool prior to placing it in the dispersion compensation module, the tension can be further relieved or relaxed by coating the coiled fiber with a finely powdered substance, for example, talcum powder or similar substance, which will not react with or otherwise harm or damage wither the fiber or the module containing it.

Additional advantages of the invention will be set forth in the following detailed description and the appended drawings. It is to be understood that the foregoing general description, the following detailed description and the drawings are exemplary and are intended to provide further explanation of the invention as claimed.

DETAILED DESCRIPTION OF THE INVENTION

The term "Free-Fiber" means a coil of fiber that is not placed on a spool or other element when placed in use in an optical device. The Free-Fiber may, however, be placed in a module, including placed around one or between two elements so that the coiled shape may be retained in the module. In such placement, the coil is loose, for example, as a is a coil of string that was first wound around a finger, removed and then placed in the palm of a hand. Generally, the coil of Free-Fiber will assume a circular or elliptical shape. Further description and understanding of the meaning of the term Free-Fiber will be attained through reading of the following text.

Figure 1:
FIG. 1 illustrates a spool assembly of the prior art that is typically used in dispersion compensation modules.
Figure 2:
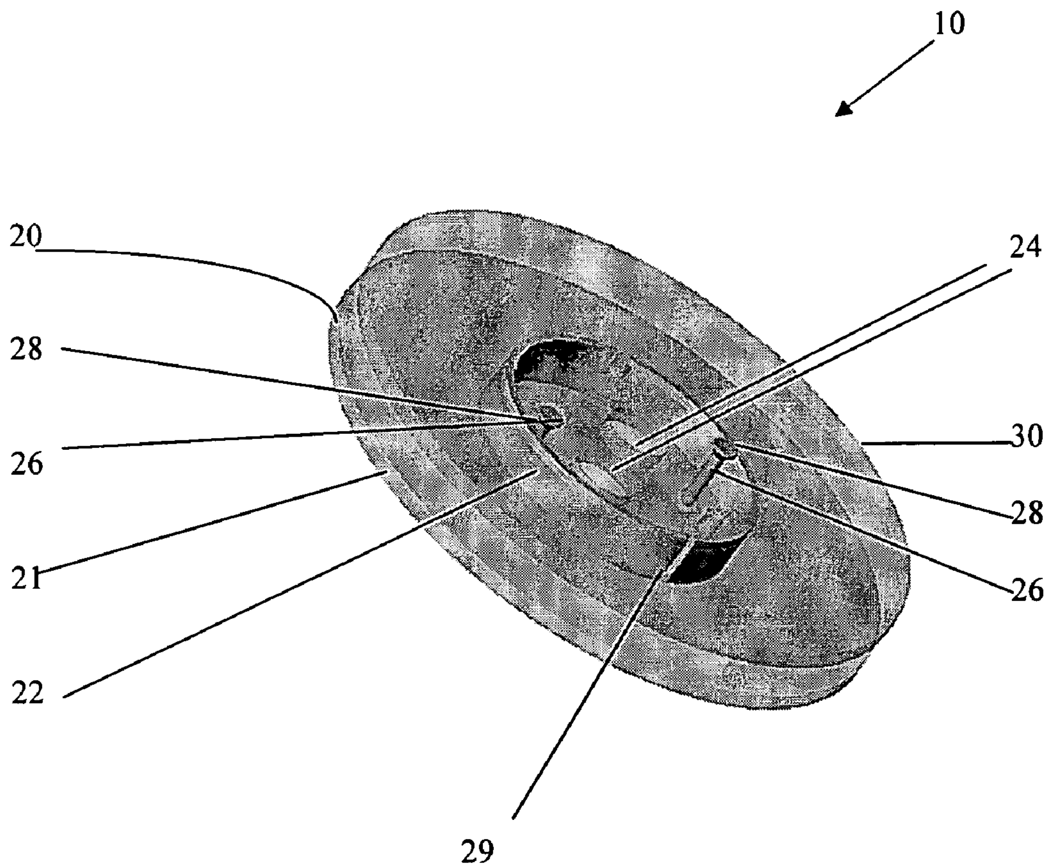
FIG. 2 illustrates a take-apart spool fixture that is used to wind the optical fiber used in the dispersion compensation module of the invention.
Figure 2A:
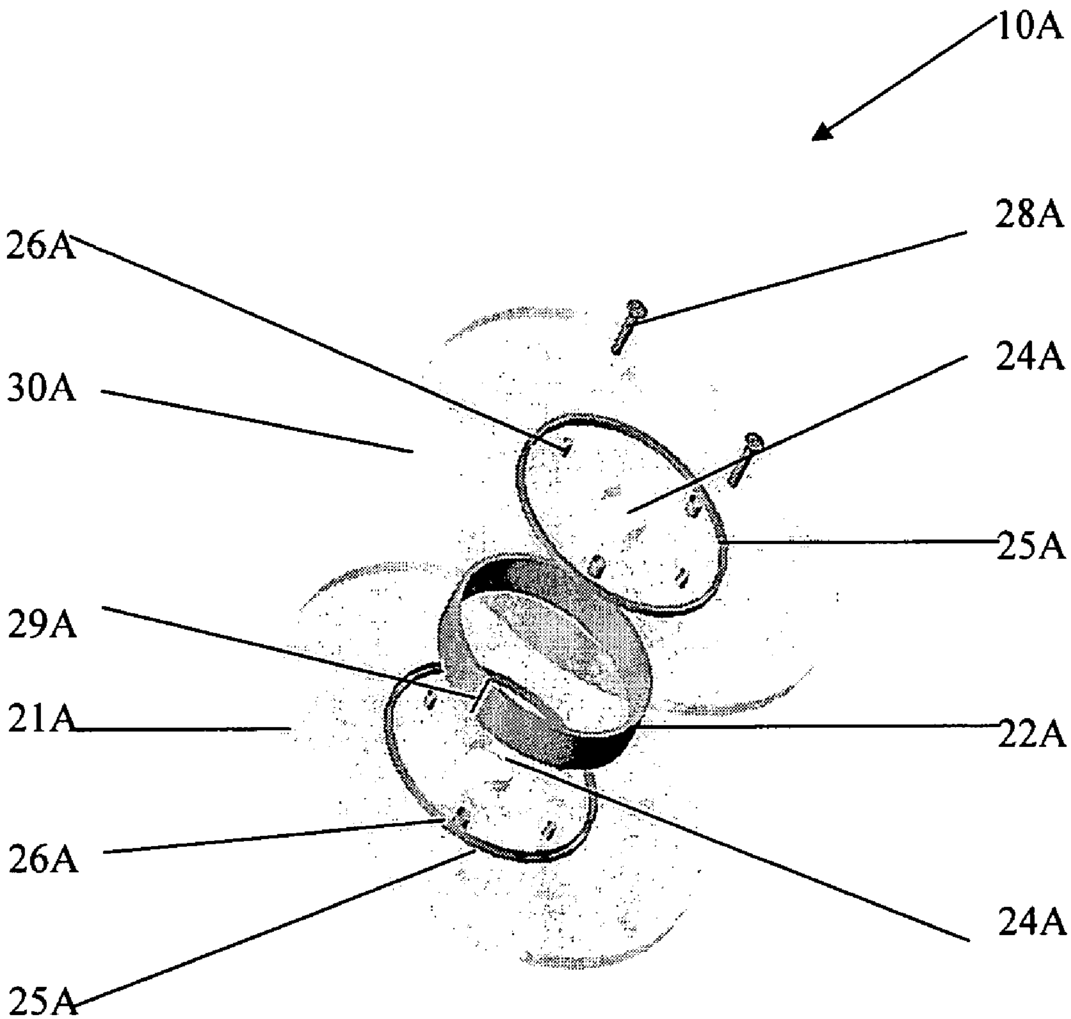
FIG. 2A is an exploded view of an alternative winding spool.

The dispersion compensation module design of the invention does not require a spool assembly for holding the optical fiber in the dispersion compensation module. However, a spool is used to wind the fiber prior to the fiber being positioned in the dispersion compensation module. In a first step, the optical fiber is wound on a take-apart spool assembly, for example, that illustrated in FIG. 2. While in a preferred embodiment the take-apart spool 10 illustrated in FIG. 2 is a molded two-piece spool including a first part 20 and a second part 30, other take-apart spools made by different methods can also be used, for example, as illustrated in FIG. 2A. Referring to FIG. 2, the first part 20 has a first flange 21 of predetermined diameter; a circular (or elliptical) hub 22 of predetermined diameter smaller than that of the first flange and coaxially positioned with respect to the first flange. The hub has a selected thickness and rises a selected distance from the first flange, and has a slot 29 through the thickness of the hub. In addition, there are at least two openings 24 through the thickness of the first flange, the openings being located within the circumference of the hub and being used to position the spool on a winding device (not illustrated) for rotating the spool to wind fiber. Further, there are at least two fastening structures 26 rising from the first flange for a distance not greater than the distance of the hub 22, the fastening structures having an internal opening for placement of fastening element, for example, a screw, to hold the second part 30 in position when the spool is fully assembled. The second part 30 is a second flange of the same diameter as the first flange, the second flange having two opening there through located such that the fastening element 28 can be inserted into the structures 26 for holding the second flange in position.

In operation, an end of an optical fiber is inserted into the slot 29 and lightly wound around the fastening structures 26. This end portion winding will become a free end that later be pigtailed. The fiber is then lightly wound about the hub for a few turns. The second part 30 is then placed on the first part 20 and fastened thereto by insertion of fastening elements 28 into fastening structures 26. The spool is then placed on a winding device and the desired length of fiber would onto the spool. When the winding is completed the fiber is cut and the spool with the wound fiber is removed from the winding device.

Referring to FIG. 2A, an alternate embodiment of the winding spool, winding spool 10A, as illustrated in the exploded drawing, is similar to that of FIG. 2, except that the hub 22A is separable from the first flange 21A; that hub 22A is positioned in openings 25A which are located in first and second flanges 21A and 30A; that there is a single opening 24A for positioning on a winding device; and that four fastening structures 26A are illustrated instead of two as in FIG. 2. Once assembled, the winding spool of FIG. 10A is used as described for above regarding winding spool 10.

The spool containing the wound or coiled fiber is then disassembled and the coiled fiber is gently removed from the spool. When the coiled fiber is removed from the spool it has been found that it retains its coiled shape allowing it to easily be placed in a cassette tray as illustrated in FIG. 3.

Figure 6:
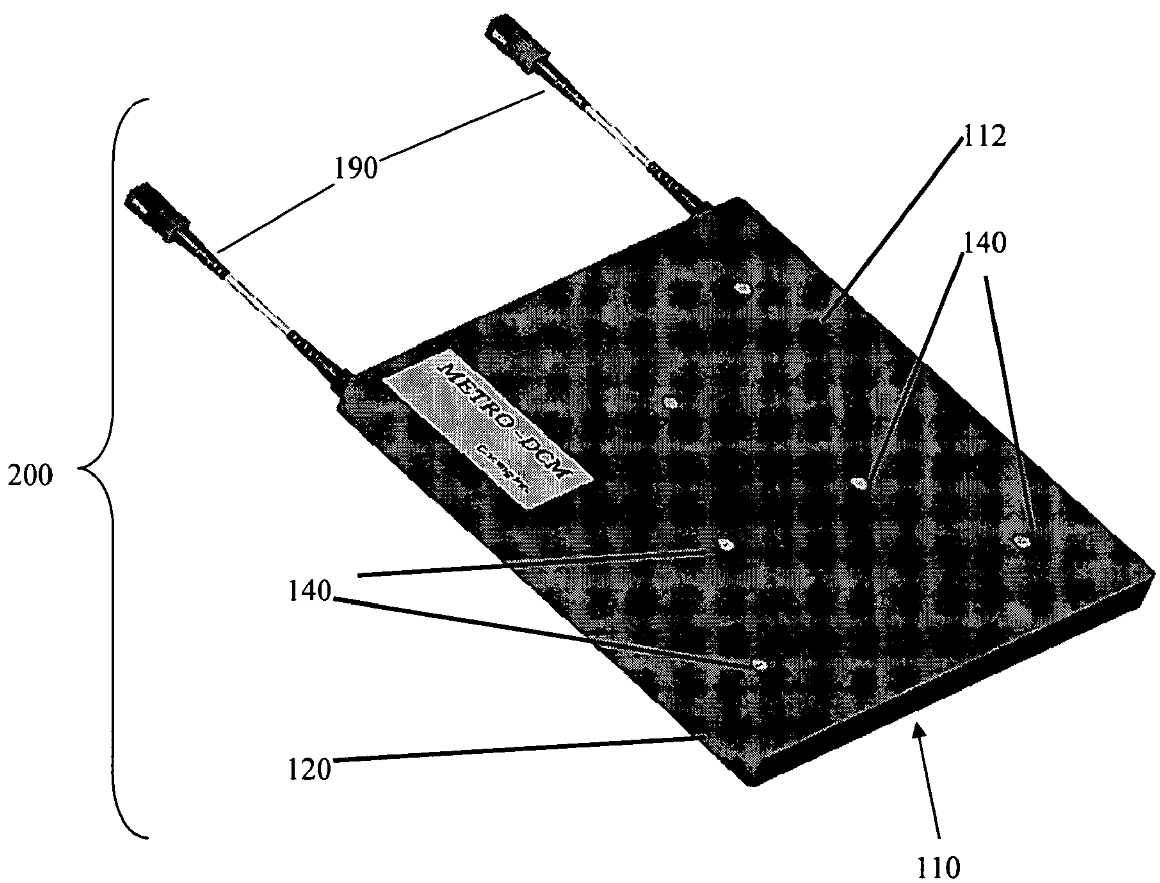
FIG. 6 illustrates the fully assembled dispersion compensation module of the invention with cover plate attached to the cassette tray.

The coil of fiber 70 (not illustrated) is then placed into one piece of a two-piece cassette tray 110 (shown in FIG. 6) which forms the dispersion compensation module of the invention. The dispersion compensation module is illustrated in FIG. 6 and is of substantially closed design. As illustrated in FIG. 6, the dispersion compensation module has openings for the insertion of fastening elements and connectors or pigtails which are used to connect the coiled fiber within the dispersion compensation module to other, external elements in a system in which the dispersion compensation module is a part. In alternate embodiments other fastening devices such as clips can be used to hold together the two pieces of the cassette tray or the two pieces can be permanently joined together, for example, by gluing.

Figure 3:
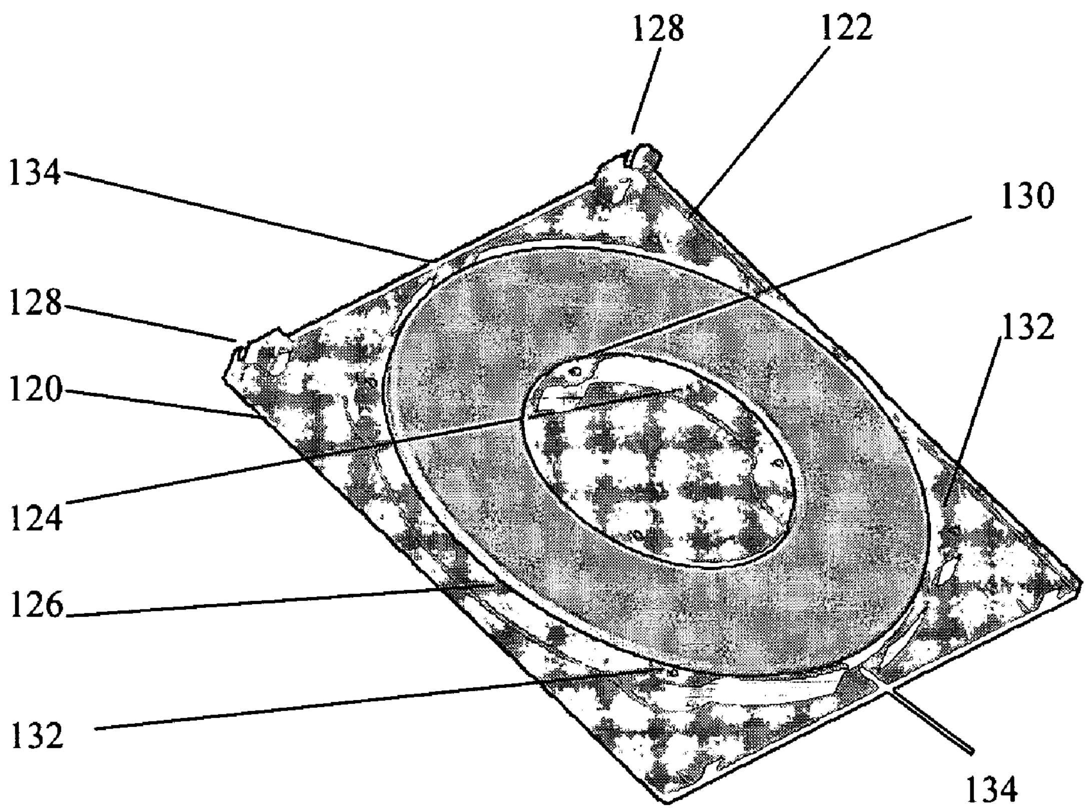
FIG. 3 illustrates the coiled optical fiber that has been removed from the spool fixture of FIG. 2 and placed in a dispersion compensation module cassette tray.

Referring now to FIGS. 3 and 6, the cassette tray 110 has of a first part 120 for placement of the fiber and a second or lid part 112 (FIG. 6) with openings 113 (not illustrated) there through for insertion of a fastening element 140 (inserted in openings 113 in FIG. 6). The first part of the tray has a wall 122 rising a distance about its outer perimeter and two shaped structures 124 and 126 of different diameter within. These structures can be circular, elliptical or any other "smooth" shape lacking sharp comers. The major criterion is that the two structures be one-inside-the-other with sufficient space between for placement of the optical fiber. In the following text the word "circular" will be used throughout and is to be understood as including all such shaped structures. Circular structures are depicted in the drawing appended hereto.

The first part also has at least two openings 128 through the outer wall 122 for insertion of a connecting element 190 (see FIG. 5) for connecting or "pigtailing" the ends 192 of the optical fiber within the tray to external leads (not illustrated) that go to some other optical element (not illustrated), for example, transmission fiber. The Free-Fiber coil 70 will be placed between the two circular structures.

The first circular structure 124 has a selected diameter, is preferably continuous along its entire diameter, and has a selected wall height and thickness. In a preferred design the inner structure has a plurality of vertical openings 130 within the wall thickness extending from the top of the wall for a distance into the wall for the insertion of a fastening element 40, for example, a screw, to connect the lid 112 to the first part of the tray by inserting the fastening element through the openings in the lid and into the vertical openings of the first circular structure.

The second circular structure within the outer perimeter of the tray has a selected diameter greater than the diameter of the first circular structure and a plurality of vertical openings 132 within the wall thickness extending from the top of the wall for a distance into the wall for the insertion of fastening elements 140. In addition, the second circular structure has at least one, and preferably two, vertical openings 134 through its perimeter wall to allow the ends 192 of the optical fiber to pass through the wall and be pigtailed to the connectors 190 at the outer perimeter of the cassette tray.

The coil 70 of Free-Fiber is placed between the two circular structures and each of the two fiber ends is connected to one of the two pigtail connectors 190. Optionally, a thin layer of a foam or other resilient material 170, having shape such that it will fit between the inner and outer circular structures 124 and 126, may then be then placed over the fiber to take up the volume and cushion the lose fiber therein as is illustrated in FIG. 3. The coil of fiber 70 lies under the resilient material 170. This layer of resilient material is circular with (1) a circumference approximately equal to the inner diameter or the second circular structure and (2) an inner opening whose diameter is approximately equal to outer diameter of the first circular structure. This use of this optional element is depends on the amount of fiber within the cassette. If such insert is used, then at this point the first tray having the fiber, the cushioning foam therein and the pigtails attached thereto is as illustrated is FIG. 4.

Figure 4:
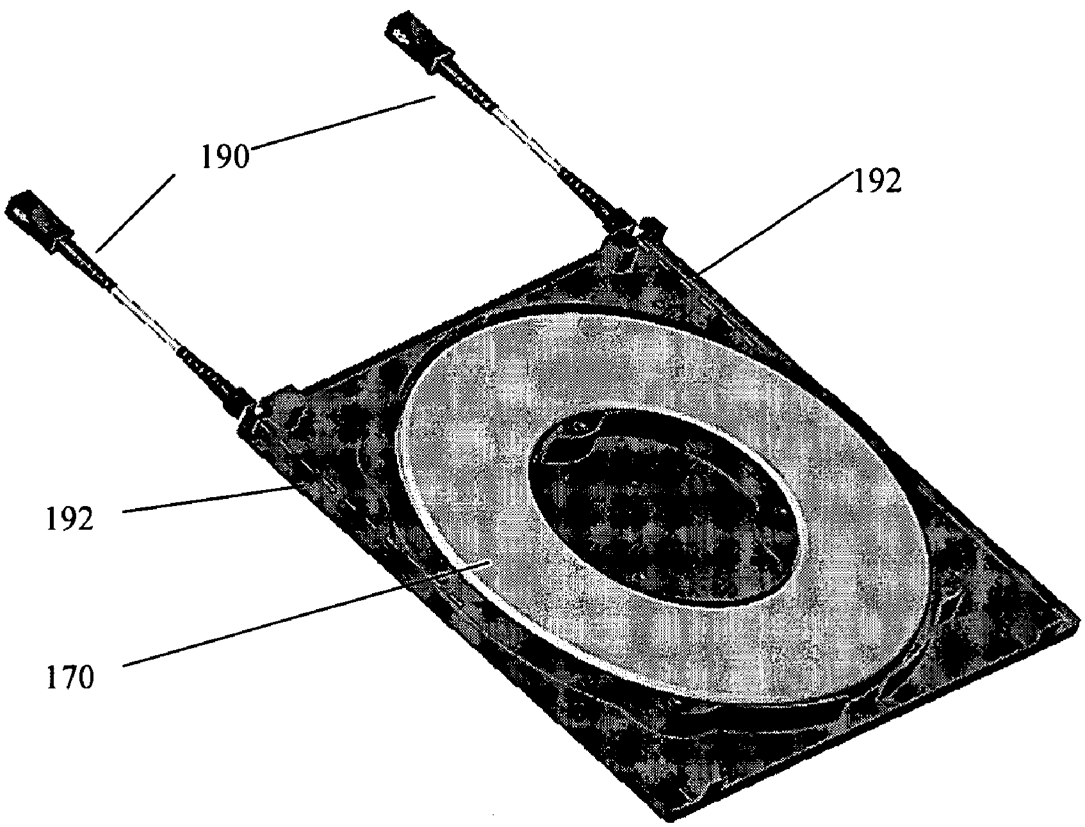
FIG. 4 illustrates the coiled fiber of FIG. 3 with pigtails attached.
Figure 5:
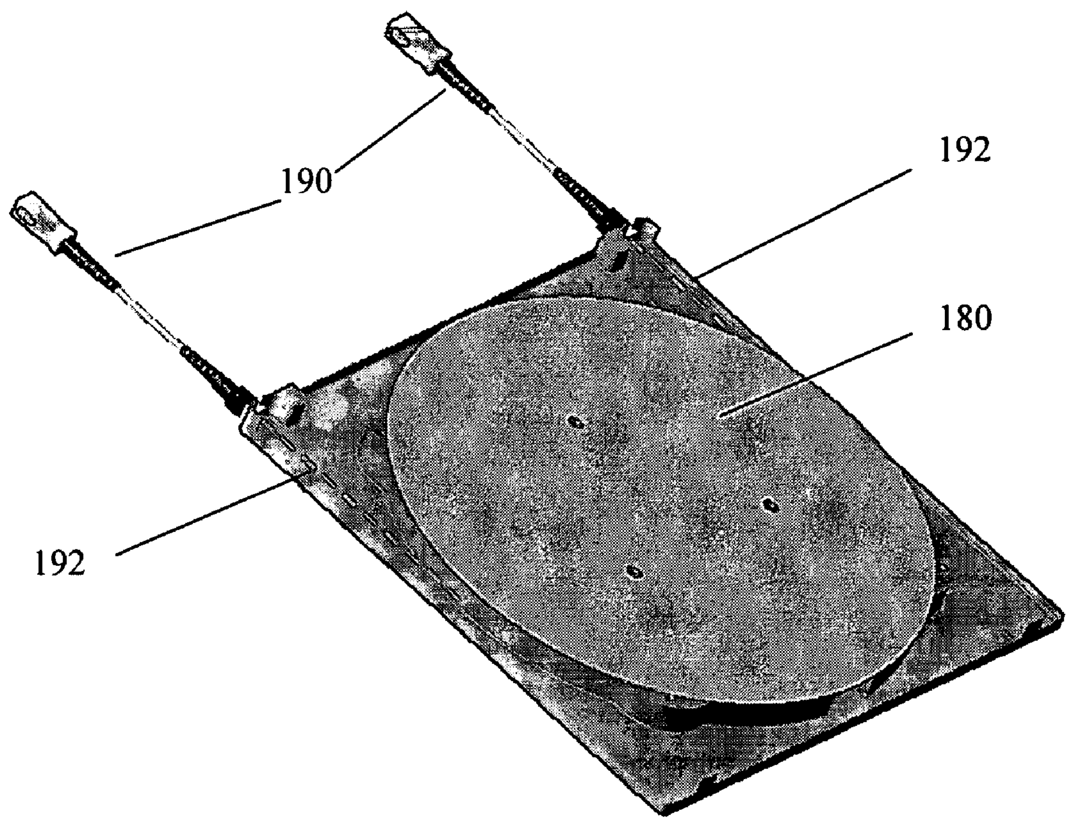
FIG. 5 illustrates the pigtailed fiber containing cassette tray of FIG. 4 with a resilient material placed on top of the coiled fiber to form a cover and protect the fiber.

Whether the optional foam element as illustrated in FIG. 4 is used, in the next step a layer of foam or other resilient material 180 with no inner opening and an outer diameter approximately that of the second circular structure is placed over the fiber and the top of the wall of the first circular structure as is illustrated in FIG. 5. In the final step, the lid 112 is placed on the tray and secured with the fastening elements 140, for example, screws as illustrated in FIG. 6. As the lid draws down against the cassette under the action of the screws, the thin foam compresses, sealing any crevices that might trap the Free-Fiber, and the lid captures the pigtail terminations and seals the entire unit from external debris, contamination and protrusions. The final assembly of the Free-Fiber dispersion compensation module is as illustrated as 200 in FIG. 6.

Figure 5A:
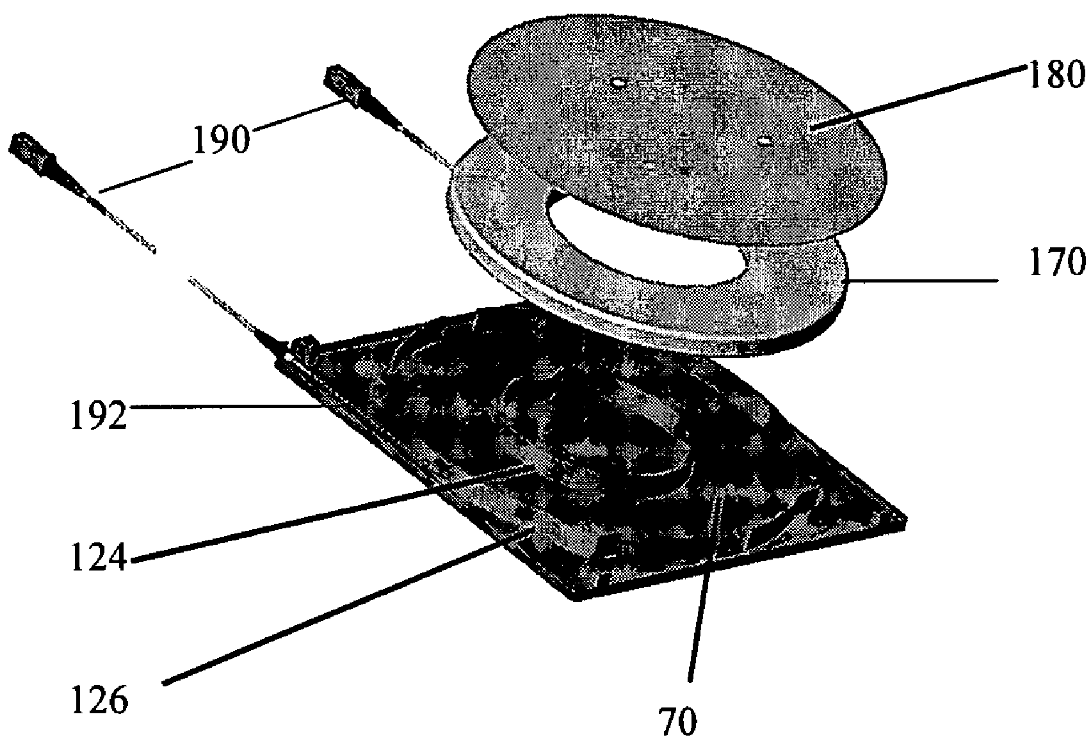
FIG. 5A is an exploded view of FIG. 5.

FIG. 5A is an exploded view of FIG. 5 illustrating the pigtails 190, a fiber end 192 attached to a pigtail 190 (the second fiber end 192 is not illustrated, but is similarly attached to a pigtail 190), the resilient material insert 170, and the resilient material layer 180. The coil of fiber 70 is not illustrated, but would lie between shaped structures 124 and 126 as indicated by numeral 70.

A further aspect of the invention is the discovery that while tension present during optical fiber winding is relieved or relaxed by removing it from the winding spool prior to placing it in the dispersion compensation module, the fiber coil can be further relaxed by coating it with a finely powdered substance which will not react with or otherwise harm or damage either the fiber or the module containing it. Examples of such powdered substances include talc, powdered corn starch, finely powder silica, and other non-interactive substances having a particle size approximating that of talc.

It will be apparent to those skilled in the art that various modifications and variations can be made to the present invention without departing from the spirit or scope of the invention. Thus, it is intended that the present invention covers the modifications and variations of this invention provided they come within the scope of the appended claims and their equivalents.

We claim:

1. A dispersion compensation module for optical communication comprising:

a take-apart cassette having (i) a first part with a first and a second shaped structure of selected height and thickness therein, said first shaped structure being located within said second shaped structure, and (ii) a second part, said second part being a lid for said first part;

(iii) a coil of optical fiber having a first end and a second end, said coil being between said first and second shaped structures; and said first and second end of said coil being connected to a first and a second pigtail, respectively; said pigtails being located at the outer perimeter of said cassette for connecting said coil of optical fiber within said cassette to an optical communication system;

wherein said second shaped structure has at least two openings there through for passage of the first and second ends of said fiber coil to said first and second pigtails, respectively; and wherein said module has a first layer of resilient material of selected thickness located between said shaped structures and said lid, said resilient material being continuous and covering at least the inner diameter of the second shaped structure.

2. The dispersion compensation module according to claim 1, wherein said coil of fiber is additionally cushioned by an second layer of resilient material, said second layer being formed to fit between said first and second shaped structures and having a thickness sufficient to fill the volume between the fiber coil and said first resilient layer.

3. The dispersion compensation module according to claim 1, wherein said coil of optical fiber is separately wound on a winding spool and removed from said winding spool prior to being placed between said two shaped structures.

4. The dispersion module according to claim 1, wherein said shaped structures are circular structures.

5. The dispersion module according to claim 1, wherein said shaped structures are elliptical structures.

6. A method of making a dispersion compensation module containing optical fiber, said method comprising the steps of:

winding optical fiber about the hub of a take-apart winding spool;

removing said fiber from said winding spool, said fiber having two ends;

placing said fiber between a first and a second shaped structure in the first part of a two part cassette tray;

connecting the end of said fiber to a connecting element at a perimeter of the cassette tray;

placing a resilient material over said optical fiber;

placing a second part lid on said first part tray; and fastening said lid to said first part tray.

* * * * *